(No Model.)
A. L. ZOEGGELE & T. H. MURPHY.
BAKING PAN.
No. 463,590. Patented Nov. 17, 1891.
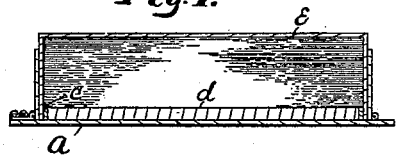
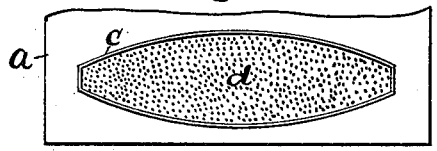
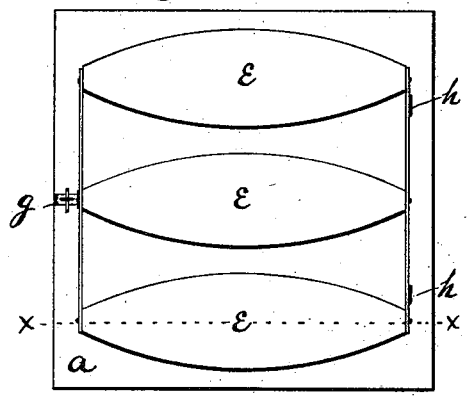
Witnesses
Fred A. Mason
A. O. Fuller
Inventors
Anton L. Zoeggele
Thomas H. Murphy
by N. W. Mason atty.

UNITED STATES PATENT OFFICE.

ANTON L. ZOEGGELE AND THOMAS H. MURPHY, OF NEW BEDFORD, MASSACHUSETTS; SAID ZOEGGELE ASSIGNOR TO PHILLIP M. ZOEGGELE, OF SAME PLACE.

BAKING-PAN.

SPECIFICATION forming part of Letters Patent No. 463,590, dated November 17, 1891.

Application filed July 8, 1891. Serial No. 398,770. (No model.)

*To all whom it may concern:*

Be it known that we, ANTON L. ZOEGGELE, a subject of the Emperor of Austria, and THOMAS H. MURPHY, a citizen of the United States, residing at New Bedford, in the county of Bristol and State of Massachusetts, have invented certain new and useful Improvements in Baking Pans or Devices in which to Bake Bread, of which the following is a specification.

It is well known that "hearth-bread"—*i. e.*, bread which has been baked on the bottom of a brick oven—is superior to bread which has been baked in a tin or sheet-iron pan; and the object of our invention is to provide a device for baking bread by means of which bread like hearth-bread may be produced in the oven of a common stove or range and at the same time cause the loaves to assume a symmetrical shape.

The accompanying drawings illustrate our invention, in which—

Figure 1 represents a view in vertical section through the dotted line $x\ x$, Fig. 4. Fig. 2 represents a view of the same with the top or mold removed. Fig. 3 represents a plan view of a portion of the base of the device having the top or mold removed, and Fig. 4 represents a plan view of the device with the top closed.

Similar letters refer to similar parts throughout the several views.

$a$ represents the base or bottom of the device, which is preferably made of sheet-iron. To the top of the base $a$ is secured the raised edge $c$ in the form which it is desired the sides of the loaf shall be. The edge $c$, which, with the base $a$, forms a shallow pan, is filled with fire-clay or some analogous material. The cover $e$ is made to fit down around the edge $c$ and serves as a mold to give symmetrical shape to the loaf as it rises into it.

The operation of the device is as follows: The proper amount of dough for a loaf is placed on the fire-clay or brick $d$ and the cover $e$ closed down over it and the whole placed in an oven. As the bread rises it takes the shape of the inside of the cover $e$, and the fire clay or brick on which it rests gives it the nature of hearth-bread.

Having thus described our invention, what we claim, and desire to secure by Letters Patent, is—

A device for baking hearth-bread in a common stove or range oven, consisting of the base $a$, having the edge $c$ raised on its upper surface and filled with fire-clay $d$ or some analogous material, and a cover $e$, fitting around the edge $c$, adapted to give symmetrical shape to the loaf of bread as it rises into it, substantially as shown and described.

ANTON L. ZOEGGELE.
          THOMAS H. MURPHY.

Witnesses:
    JAMES C. HITCH,
    HENRY W. MASON.